Oct. 31, 1939.  E. A. THOMPSON  2,177,964
SYNCHRONIZING CLUTCH MECHANISM
Original Filed Nov. 9, 1935   3 Sheets-Sheet 1

Inventor
Earl A. Thompson
Blackmore, Spencer & Hunt
Attorneys

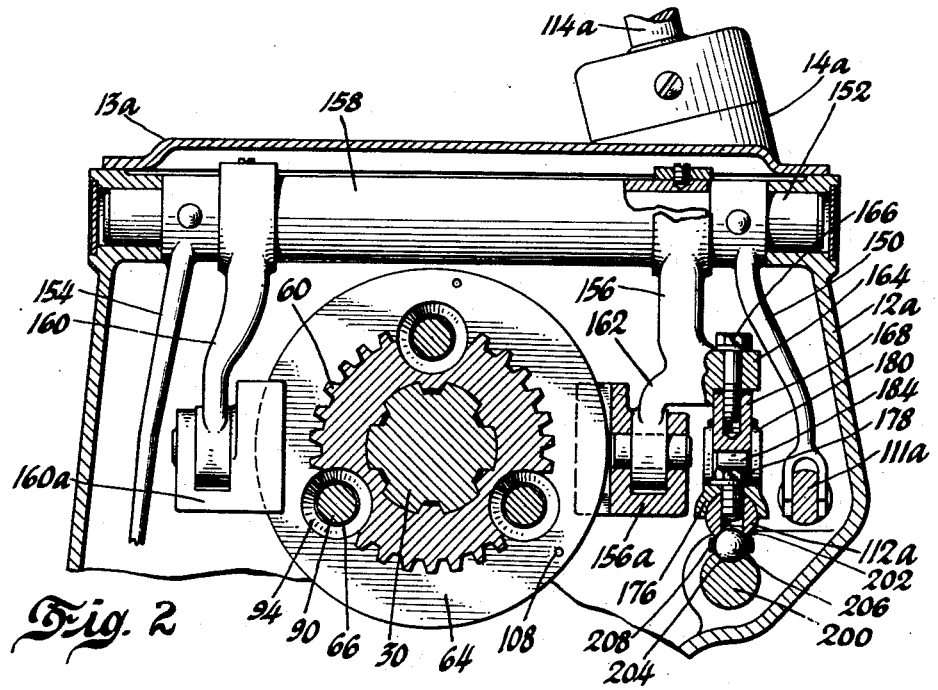
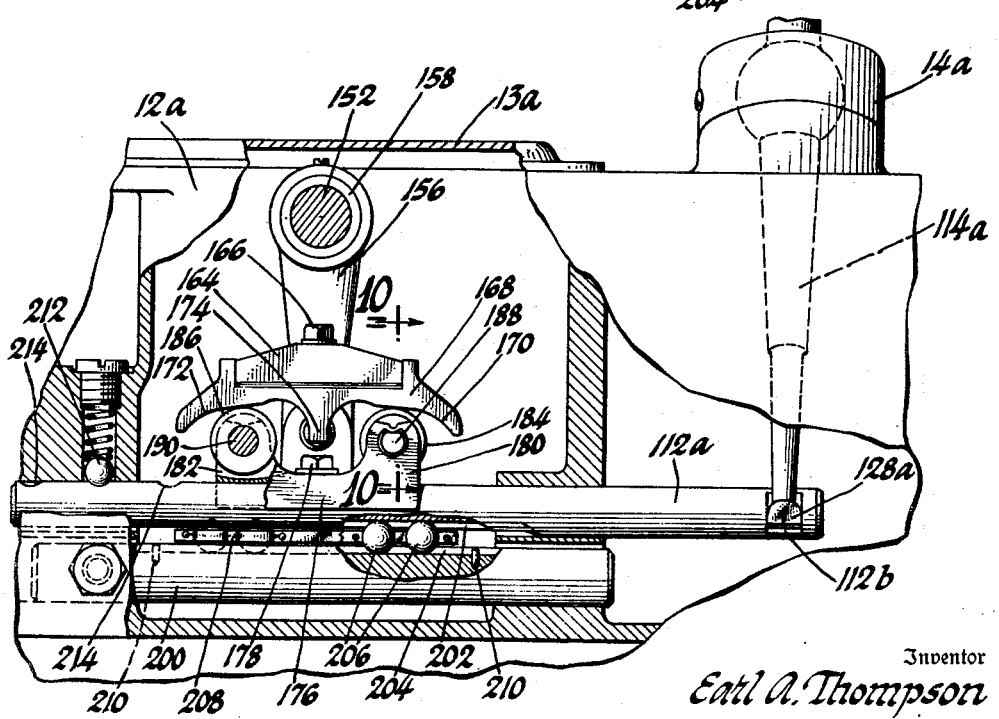

Oct. 31, 1939.   E. A. THOMPSON   2,177,964
SYNCHRONIZING CLUTCH MECHANISM
Original Filed Nov. 9, 1935   3 Sheets-Sheet 3
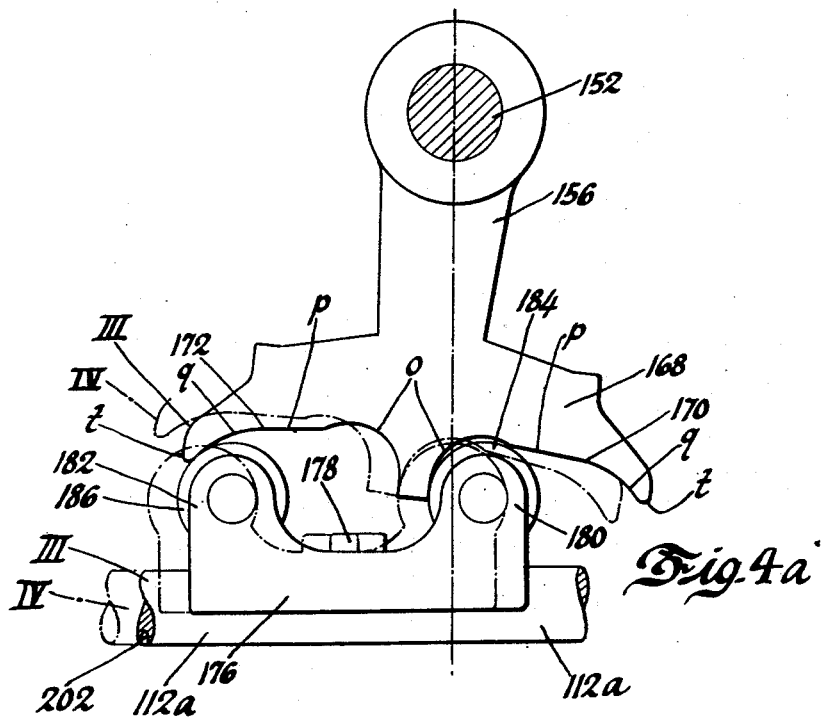
Fig. 4a
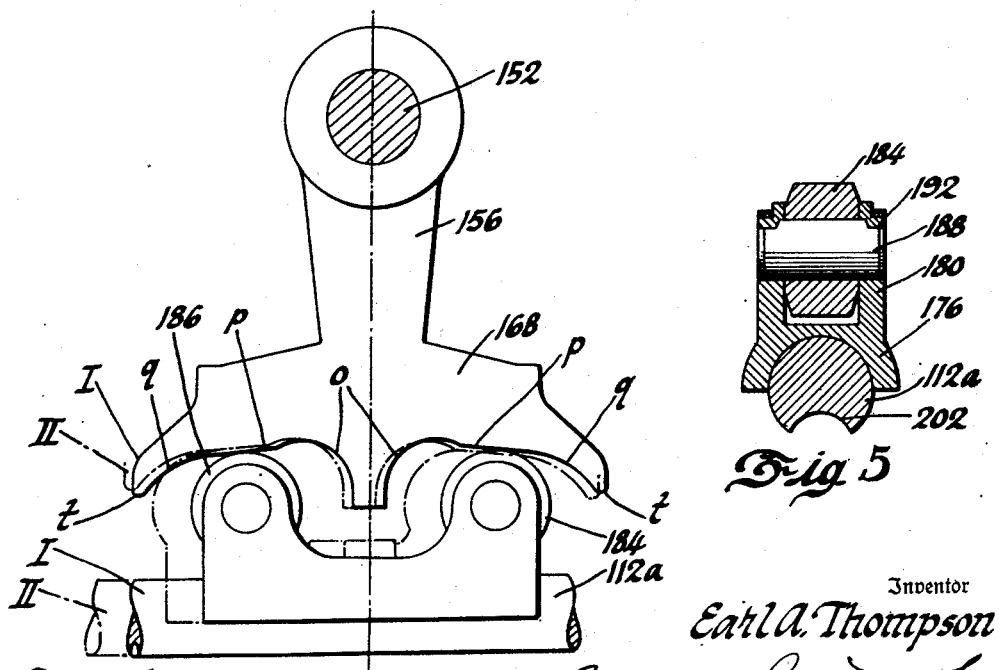
Fig. 4
Fig. 5
Inventor
Earl A. Thompson
Blackmore, Spencer & Flint
Attorneys Patented Oct. 31, 1939

2,177,964

UNITED STATES PATENT OFFICE 2,177,964

SYNCHRONIZING CLUTCH MECHANISM

Earl A. Thompson, Birmingham, Mich., assignor to General Motors Corporation, Detroit, Mich., a corporation of Delaware Original application November 9, 1935, Serial No. 48,971. Divided and this application June 18, 1937, Serial No. 148,852. In Canada May 15, 1936

9 Claims. (Cl. 74—473)

This application is a division of United States application Serial No. 48,971, Patent No. 2,101,826. The invention disclosed herein relates to mechanism for operating frictional and positive synchronizing clutches, more particularly synchronizing clutches of the inertia check type disclosed in the parent application.

The object of the invention is to multiply the force received by the ratio change lever and transmit the force to the movable elements of a synchronizing clutch increased to such a degree that the friction clutch elements may be engaged with sufficient pressure to insure synchronization within the brief interval of time consumed in changing ratios in a moving motor vehicle.

The invention consists of a power transmitting synchronizing clutch control mechanism of high mechanical advantage whereby powerful synchronizing effort may be applied to the friction elements, and relaxed before engagement of the positive elements, said means comprising specifically roller cam mechanism operatively disposed between a shift rail for second and third speed trains and a cam-equipped lever to which the shifter yoke that imparts movement to the slidable coupling element is secured.

In the accompanying drawings wherein like reference characters indicate like parts throughout the several views;

Fig. 2 is a cross section on line 2—2 of Fig. 1.

Fig. 3 is a view from the right-hand side of Fig. 2 disclosing the control mechanism partly in longitudinal section.

Fig. 4 is a diagrammatic view illustrating the manner in which parts of the mechanical advantage mechanism operate and shows the first and second positions of that mechanism during the first moiety of the shifting operation.

Fig. 4a is a diagrammatic view of the parts shown in Fig. 4 in third and fourth positions during the second moiety of the shifting operation, and Fig. 5 is a cross section on line 10—10 of Fig. 3.

Figure 1:
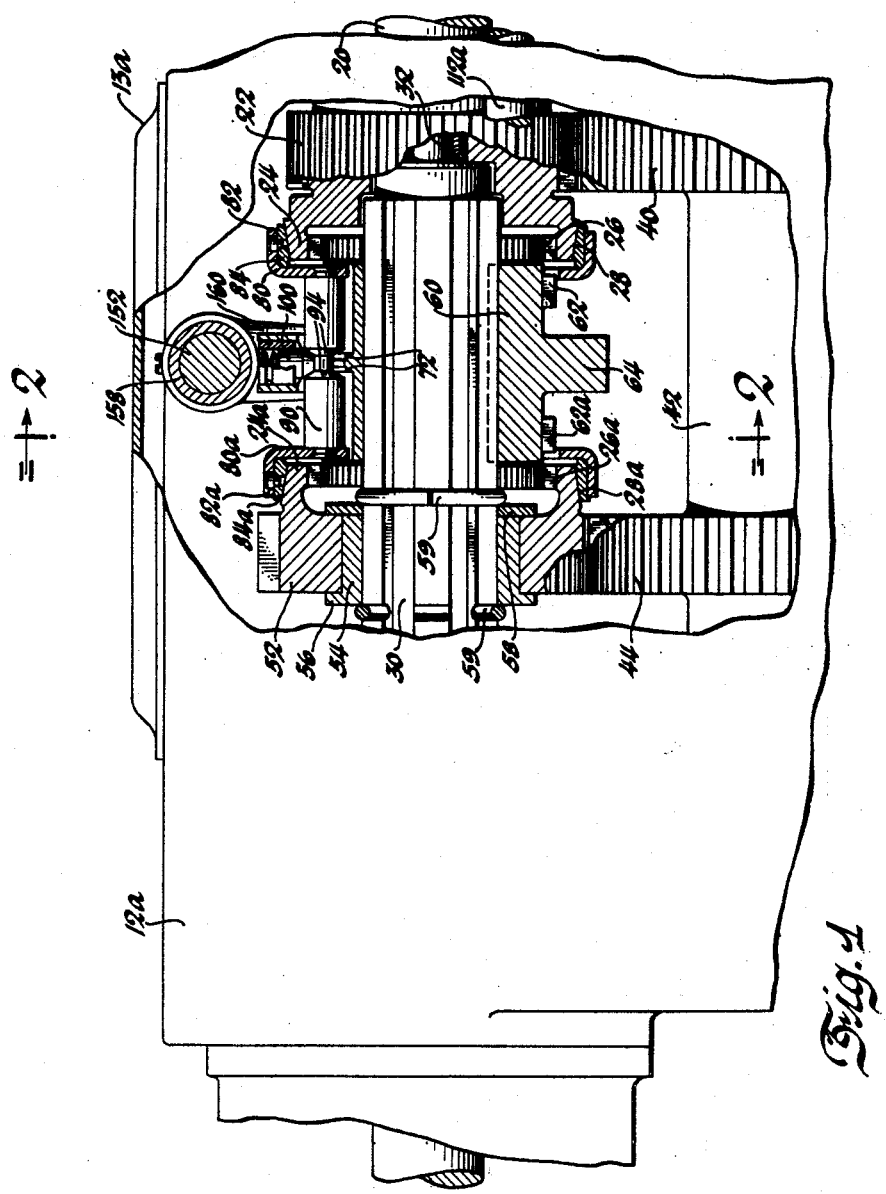
Fig. 1 is an elevation of a transmission casing partly broken away and exposing inclosed change gear mechanism.

In the drawings numeral 12a indicates a transmission casing, the upper part of which is closed by a cap 13a. The power delivering end of an input shaft 20 enters the front of the casing and is rotatable in a bearing not shown. The end of shaft 20 within the casing is equipped with a countershaft driving gear 22 which has integrally or otherwise joined to its rear face an annular rearward-trending adjunct 24 carrying internal gear-like clutch teeth 26 and formed with an external conical friction clutch surface 28. The series of clutch teeth 26 constitute with said adjunct 24 a positive clutch element and said adjunct with its conical clutch surface constitutes a friction clutch element which is combined with axially movable positive and friction clutch elements to constitute a synchronizing coupling means to couple the transmission mechanism to operate in third or high speed ratio.

A main driven shaft 30, commonly designated the spline shaft in motor vehicle nomenclature, is disposed in axial alinement with main clutch shaft 20, which is provided with an axial bore in its rear end in which the reduced forward end 32 of the spline shaft is piloted. The rearward end of shaft 30 passes through the rear wall of the transmission casing 12a and is as usual mounted in bearings (not shown) in the casing.

Countershaft driving gear 22 meshes with a gear 40 rigid on countershaft 42, which has also rigidly connected to it, a gear 44 of the second speed train and other gears not shown since they are immaterial to this invention.

Gear 52 is mounted coaxial with spline shaft 30 on a bearing member 54 secured to the shaft so as to rotate with it. Said bearing has an integral flange 56 at one end and a separable flange 58 secured at the other end. Snap rings 59 or the like prevent axial movement of the bearing member 54 on shaft 30. Flanges 56 and 58 prevent axial movement of gear 52 with respect to bearing member 54. Gear 52 is in constant mesh with countershaft gear 44, and is a part of the second speed train. It rotates freely on bearing member 54 unless locked to shaft 30 by means to be described.

Gear 52 is formed with an annular forward-reaching adjunct 24a similar to the adjunct 24 on gear 22. Adjunct 24a carries internal gear-like clutch teeth 26a and has an external conical friction surface 28a, corresponding to the elements 26 and 28 on adjunct 24 integral with gear 22. The body of gear 52 and adjunct 24a with clutch teeth 26a and external friction cone 28a constitute one-half of a synchronizing coupling means to establish the transmission in second speed ratio.

In order to lock shaft 30 either to the main clutch shaft 20 for direct, high speed driving, or to the gear 52 for second speed driving, a positive coupling element 60 is slidably keyed to shaft 30 between the gears 22 and 52. Coupling element 60 has external gear-like clutch teeth 62 at its forward end adapted to interlock with the internal gear-like clutch teeth 26 on the part 24 rigid with gear 22. External gear-like clutch teeth 62a on its rearward end are adapted to interlock with internal gear-like clutch teeth 26a on part 24a rigid with gear 52. When coupling element 60 is moved forward teeth 62 interlock with teeth 26 with the result that shaft 30 is locked to the gear 22 and main clutch shaft 20 to couple the transmission in third speed. When coupling element 60 is moved rearward teeth 62a interlock with teeth 26a with the result that gear 52 becomes locked to shaft 30 so that the transmission is coupled in second speed.

Coupling element 60 is formed midway between its ends with a radially extending circumferential flange 64. Longitudinal openings spaced (in the form of the invention illustrated) 120° apart, extend from end to end.

Cooperating with the conical friction surface 28 of annular adjunct 24 rigid with gear 22 is an annular drum or cupped friction clutch element 80 having secured within its flange 82 an internally coned friction ring 84 adapted to be engaged with the conical surface 28 on adjunct 24 integral with gear 22. Another similar drum or cupped friction clutch element 80a carries secured within its flange 82a, a similar friction ring 84a adapted to engage over the conical surface 28a on part 24a of gear 52. Each cupped friction clutch element 80 and 80a is of ring-like form and composed of flanges at right angles one to the other.

The friction clutch elements 80 and 80a are secured together by bars 90 that pass through the openings in slidable toothed coupling element 60 and its flange 64. The mid portions of the bars 90 are reduced and formed with checking surfaces 94 to coact with the beveled edges 72 of the openings in element 60 and flange 64 as means to resist meshing of the positive clutch elements until the friction elements have effected synchronization. When the positive coupling element 60 is shifted toward the companion positive elements it carries with it the friction clutch elements by reason of a yieldable latch connection 100 carried by the coupling element 60, said latch engaging the reduced mid portions of the bars 90. The initial frictional engagement brings the checking surfaces into line with the edges of the openings, thereby resisting further longitudinal movement of the coupling element 60 until synchronization occurs in accordance with the well known mode of operation of inertia check synchronizers.

The means thus far described in outline are described in detail and claimed in the application of which this is a division.

In the tower-like riser 14a a shift lever 114a is fulcrumed. Said shift lever is constructed and arranged to engage selectively one or the other of the parallel shifter rails 111a and 112a by causing its lower end to enter a notch in one rail or the other. Thereafter by rocking the lever fore and aft a shift may be made in the usual manner. In Fig. 3 the lower end 128a of shift lever 114a is shown engaged with a notch 112b formed in shift rail 112a which is a part of the mechanism by which the muscular force of the operator applied to the shift lever is transmitted to the coupling element 60 in order to couple the synchronized second and third speed trains. Shift rail 111a transmits the force exerted by the operator (when the lower end of shift lever 114a is engaged with said rail), to arm 150, which is secured to one end of a rock shaft 152 journaled in the casing 12a. Secured to the opposite end of said rock shaft is an arm 154 which may be connected to reverse or other unsynchronized transmission elements, not shown, since only the means for coupling the synchronized trains form the subject of the invention claimed herein.

The means shown for shifting coupling 60 comprises said shift rail 112a slidable in bearings in casing 12a, as shown in Fig. 3; a rock arm 156 adapted to be rocked by a longitudinal motion of said rail 112a, by means to be presently described; a hollow rock shaft 158 to which arm 156 is rigidly connected at one end; a rock arm 160 rigidly connected to the other end of the rock shaft, and shoes 156a and 160a hinged to said rock arms and grooved to engage the flange 64 of coupling 60 at diametrically opposite locations. Hollow rock shaft 158 is sleeved over rock shaft 152 and is rotatable independently of the latter. The arm 156 has two branches one of which, designated 162, supports the pivoted shoe 156a and the other, 164, constitutes a part of the means whereby force is imparted to rock the arm 156 by longitudinal movements of shift rail 112a.

The branch 164 of arm 156 is elongated in a direction perpendicular to the center plane that includes the pivotal axis of said arm; and so parallel in general with shift rail 112a when the parts are in neutral position. To said branch 164 is secured, as by bolt 166, a member 168 having two relatively reversed but otherwise identical camming surfaces 170 and 172. The camming surfaces are separated, as shown, by a median pendant terminal 174.

A cam carrier such as saddle member 176, secured rigidly to shift rail 112a, as by bolt 178, is provided at each end with spaced ears 180, 182. Camming rollers 184 and 186 are pivoted between the respective spaced ears on stout pivot pins 188 and 190. The pivot pins may be prevented from rotating within the supporting ears by any suitable device. The ends of the pins are shown as flattened and shouldered on one side as at 192 (Fig. 5) and the metal of the ears above the flattened and shouldered portions staked or swedged down into contact with the flattened surfaces and shoulders as shown, thus securing the pins so that they can neither rotate nor move endwise in the supporting ears.

As the transverse strains on shift rail 112a are severe while shifting into second and third speed ratios, rail 112a is reinforced by a short rail 200, which is secured in the casing, as shown in this embodiment, directly beneath and parallel with rail 112a. Rails 112a and 200 have opposed longitudinal grooves 202 and 204 constituting ball races for receiving bearing balls 206 which are retained properly spaced in the races by a retainer 208. Stop pins 210 may be disposed in groove or race 204 of rail 200 in order to prevent too great a displacement of the bearing balls lengthwise of the grooves. Four balls are shown spaced so that two are arranged normally substantially beneath each camming roller 184, 186, when the shift lever and connected parts are in neutral, as illustrated in Fig. 3.

The cam surfaces 170 and 172 on member 168 may be considered as divided each into three portions—$o$, $p$ and $q$. The portion $o$ is curved in an arc which approximates an arc of the same radius as the rollers 184 and 186. The portion $p$ is a substantially plane surface and forms an angle of say 5°15′ more or less with a plane perpendicular to the center plane of arm 156 that includes its pivotal axis. Said portion $p$ therefore makes an angle of 5°15′ with the rail 112a, when the parts are in neutral, since the latter is then perpendicular to the center line of arm 156. At each side of terminal 174 plane surface p merges into curved surface q, which forms an increasing angle with rail 112a from the end of surface p to the tip t.

When the parts are in neutral or starting position as shown in Fig. 3 and in Fig. 4 in solid lines, the rail 112a is held in the said position of its range of endwise motion by the spring latch 212 which then engages the middle one of the three detaining notches 214 in the rail. At this time, of course, the shift lever may be in the cross slot of the usual H-gate or equivalent, or it may have been moved laterally so as to place the end 128a in the notch 112b of the rail. Under these conditions both rollers are in contact with the plane portions p of the cam surfaces on the member 168, the midplane of arm 156 that includes its pivotal axis being perpendicular to the rail 112a.

Assuming that it is desired to shift into second speed, the operator pushes the upper end of the shift lever forward (to the right as viewed in Fig. 3) thus moving rail 112a with rollers 184 and 186 rearward, causing the left-hand roller 186 as shown in Figs. 3, 4 and 4a to move rearward (to the left of said figures) and so causing the lever 156 to move clockwise thus rocking shaft 158 and attached arm 160 in the same sense of direction. The shoes 156a and 160a on arms 156 and 160 that engage the circular flange 64 of coupling member 60 move said coupling member rearward carrying with it the friction clutch elements 80 and 80a. The range of axial movement of the friction clutch elements from neutral position rearward is a few thousandths of an inch, and this distance is traveled before the roller 186 has reached the end of the plane cam surface p. In the first part of this movement sufficient frictional pressure is exerted between the friction cone surfaces due to the action of the cocking spring-detents 100 to cause the drum 80a to rotate with the gear 52 and cock the synchronizing parts, that is, bring the beveled checking surfaces 72 and 94 on the pins 90 and flange 64 into alinement in case the oil friction between the surfaces of the cones has not already done so. Continuing movement of the shift lever, acting through the parts described upon the checking surfaces 72 and 94, forces the conical friction surfaces together, squeezes out the oil film, and thus brings the positive coupling elements to equal velocities. Synchronizing is completed while the roller is in contact with the cam portion p, said roller moving faster than arm 156, and operating it with high mechanical advantage.

Further advance of the rail 112a brings roller 186 into contact with the curved part q of the cam surface 172. The movement of arm 156 is then accelerated. The result is that, the resistance of the checking surfaces having been substantially removed, the coupling 60 advances rapidly toward its companion. As the roller 186 makes contact with the tip t of member 168 the other roller 184 moves against the pendant end 174 of arm 156 and swings said arm at the speed of the rail 112a causing the teeth 62a of the positive clutch element 60 to slide rapidly into full engagement with the teeth 26a of its companion.

It will be observed that the rail 112a and rollers 184, 186 move progressively faster than the extremity of arms 156 from the neutral point until roller 184 catches up with the terminal member 174; after contact with said member 174 the roller and arm move at substantially the same speed. The course of travel of rollers and arm from neutral position to the end of the course when the teeth of the positive coupling elements become fully meshed may be considered as including four goals or critical positions. Position I is the neutral position of the parts shown in Fig. 3 and in full line in Fig. 4. Position II is that assumed by roller and arm when the former has moved along the cam surface p far enough to have caused the cone friction elements to effect synchronization. From position II to position III the roller has engaged the cam surface q and moved arm 156 at rapidly increasing speed, pushing the slidable positive clutch element rapidly toward its companion, the friction elements having been released when synchronization occurred. Position IV is at the end of the travel of rollers and arm 156 when detent latch 212 has engaged the forward notch 214 and the positive clutch jaws are fully meshed. Movement of both roller 186 and arm 156 from position III to position IV is, as before stated, at the same speed since during that movement roller 184 bears against terminal member 174.

During the movement of the roller from position I to position II it will be apparent that a large quantity of force is applied to the arm 156 and consequently to the coupling 60 to effect synchronization because of the high mechanical advantage afforded by the inclined cam surface p. The advantage increases, it is apparent, the further the roller moves along that surface toward the surface q. The surface p is made long enough to allow for wear in the clutch surfaces. When the surfaces are new travel of roller 186 along cam surface p for less than half the distance from neutral to the end of that surface accomplishes synchronization. The remainder of this surface is available for synchronization after wear has made necessary increased movement of the friction clutch drum from neutral.

The operation of shifting from neutral to third speed ratio is the same as that described for shifting into second, the movements being reversed or in the opposite sense. In moving the parts from second or third speed ratio back to neutral the advance roller in the return movement will move arm 156 back by engaging the cam surface q which is on the same side of the end member 174; and when neutral position is attained both rollers will be respectively in substantial contact with the respective surfaces p as illustrated.

It will be apparent that by an even movement imparted by a normal effort of the driver to shift lever 114a when it has been selectively interlocked with rail 112a, the friction clutch elements will be forced into engagement with an augmenting force greatly exceeding that applied to the shift lever; that after synchronism has been attained the checking surfaces are displaced as is usual in transmissions of the inertia check type and the slidable coupling moved with accelerating speed into interlocking engagement with its companion.

I claim:

1. A lever adapted to effect engagement and disengagement of a clutch; movable camming means; means for guiding the camming means in a straight path; said lever having a cam surface in the path of the camming means contoured to cooperate with the movable camming means to move the lever with high mechanical advantage during the early part of its movement, and another surface cooperating with the camming means during the latter part of its movement to accelerate the movement of the lever.

2. A supporting casing, a lever adapted to effect engagement and disengagement of a clutch; slidable camming means guidable in suitable bearing means in the casing frame for moving said lever; a stationary reinforcing member at one side of and extending parallel with the direction of movement of the camming means for the full length of movement thereof and arranged to resist the direct reaction force of the slidable camming means while the latter is moving the lever; said lever having a cam surface in the path of movement of the camming means.

3. A lever adapted to effect engagement and disengagement of a clutch; camming means adapted to engage said lever; a slidable shift rail for supporting and guiding said camming means; a stationary reinforcing member having a straight surface parallel with the shift rail on the side opposite that on which the camming means is mounted and coextensive with the amplitude of movement thereof; said shift rail having bearing engagement with the reinforcing member.

4. A combination as defined in claim 3, with roller bearing elements between the shift rail and reinforcing member.

5. A lever adapted to effect engagement and disengagement of a clutch, said lever having a transverse member extending parallel with the plane of movement of the lever and having a cam surface, a slidable camming means and means for guiding said camming means into operative engagement with the cam surface of the lever, said cam surface having a contour formed to cooperate with the slidable camming means so as to move the lever with high mechanical advantage during the early part of its movement and to accelerate the movement of the lever at the expense of mechanical advantage during the latter part of its movement.

6. A lever adapted to effect engagement and disengagement of a double ended synchronizing clutch, said lever having a transverse member extending on opposite sides of the lever parallel to the plane of movement of the lever, the transverse member having cam surfaces diverging toward the ends of the transverse member and away from the lever fulcrum at different angles in different parts of its length, and camming means movable to engage said cam surfaces, said cam surfaces being of a contour to cause the camming means to move said lever with a high mechanical advantage during the early part of the movement of the camming means in either sense of direction and to accelerate the movement of the lever at the expense of mechanical advantage during the latter part of the movement of the camming means in either sense of direction.

7. A lever adapted to effect engagement and disengagement of a clutch, said lever having a transverse member extending on opposite sides of the lever parallel to the plane of movement of the lever, said transverse members having cam surfaces diverging toward the ends of the transverse members and away from the lever fulcrum, a central projection on the lever between said camming surfaces, and movable camming means provided with separate cam elements adapted to engage the respective cam surfaces on opposite sides of the central projection.

8. A clutch operating lever having a cross member extending equal distances on opposite sides of said lever, said cross member having relatively reversed cam surfaces one on each side of the center thereof, said cam surfaces diverging oppositely toward the ends of the cross member and away from the fulcrum of the lever, a central projection extending from the cross member midway of said diverging cam surfaces, and a camming member slidable in a straight path in both senses of direction, said camming member having two spaced apart roller camming elements disposed on opposite sides of said projection and spaced therefrom in neutral position of the lever.

9. Means for operating a synchronizing clutch comprising a slidable shift rail, a manual shift lever engageable with the shift rail whereby said shift rail may be actuated; camming means on the shift rail; a pendent lever arm having cam surfaces arranged in the path of movement of the camming means, and means movable with the pendent lever arm for effecting engagement of a clutch; a fixed reinforcing member parallel with said shift rail, said reinforcing member having a length at least coextensive with the extent of movement of the camming means and bearings between said rails and reinforcing member to receive the reaction of the camming means.

EARL A. THOMPSON.